United States Patent [19]
Parrow et al.

[11] Patent Number: 4,682,796
[45] Date of Patent: Jul. 28, 1987

[54] FUEL LINE ADAPTOR

[76] Inventors: R. Alan Parrow, 53 Montana Dr., Holden, Mass. 01520; Francis W. DiAntonio, 26 Fairview Dr., Leicester, Mass. 01524

[21] Appl. No.: 857,044

[22] Filed: Apr. 29, 1986

[51] Int. Cl.$^4$ .............................................. F16L 35/00
[52] U.S. Cl. ......................................... 285/39; 285/93; 285/184; 285/192
[58] Field of Search .................... 285/184, 192, 39, 93

[56] References Cited

U.S. PATENT DOCUMENTS

| | | | |
|---|---|---|---|
| 243,446 | 6/1881 | Haggerty | 285/192 X |
| 307,325 | 10/1884 | Pattison | 285/192 X |
| 1,734,966 | 11/1929 | Elmendorf | 285/192 X |
| 2,000,087 | 5/1935 | Meeker et al. | 285/184 X |
| 4,288,103 | 9/1981 | Gallagher et al. | 285/39 |
| 4,404,983 | 9/1983 | Scheurenbrand | 285/158 X |

FOREIGN PATENT DOCUMENTS

| | | | |
|---|---|---|---|
| 217116 | 3/1957 | Australia | 285/192 |
| 1580540 | 9/1969 | France | 285/192 |
| 533966 | 2/1941 | United Kingdom | 285/39 |

*Primary Examiner*—Dave W. Arola
*Attorney, Agent, or Firm*—Blodgett & Blodgett

[57] ABSTRACT

A fuel line adapter for a fuel tank comprising an elongated feed tube having an inlet opening at one end and an outlet opening at the opposite end. Tubular coupling means slidably mounted on the feed tube for engaging the outlet opening of the fuel tank and a standard fuel line pipe fixture and sealing means for forming a seal between the tubular coupling means and the outer portion of the feed tube. The feed tube has an outer portion which extends horizontally outside of the tank and extends through the coupling means to the outlet opening and also includes an inner portion which extends from the outer portion to the inlet opening and at an angle to the outer portion for extending within the fuel tank from the outlet opening of the fuel tank so that the inlet opening of the feed tube is substantially above the outlet opening of the fuel tank.

7 Claims, 4 Drawing Figures

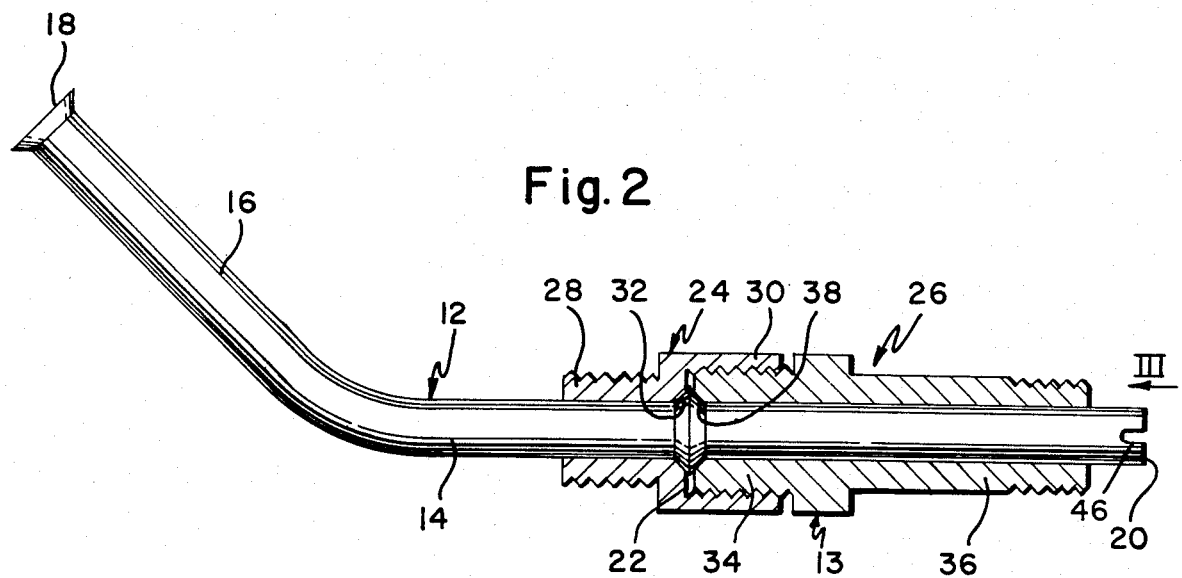
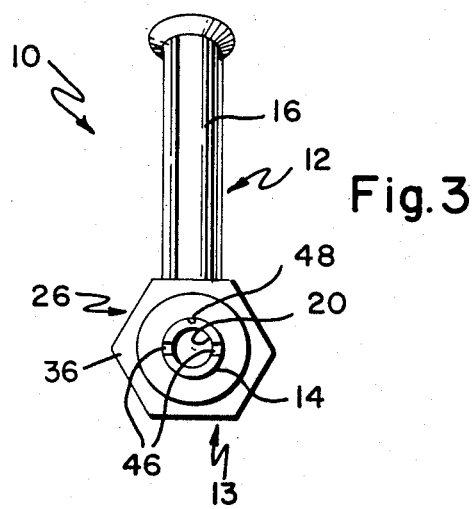
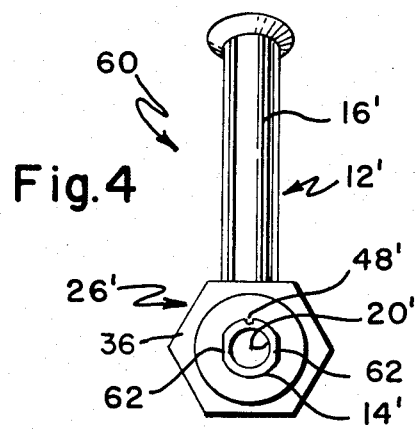

FUEL LINE ADAPTOR

BACKGROUND OF THE INVENTION

The present invention relates generally to a fixture for a fuel tank and particularly to an adaptor fixture for an existing feed system at the outlet of a fuel tank for heating oil.

Industrial and domestic oil heating systems include a fuel storage tank which is operatively connected to an oil burner system by a fuel line. The fuel line is connected to an outlet opening near the bottom of the tank. After a period of time, sludge and water accumulate along the bottom of the tank. When the sludge and water level reaches the outlet opening of the tank, i.e. after a period of 6 to 8 years, sludge and water begins to enter the fuel line. This material interferes with the efficiency of the oil burner and eventually leads to serious damage to various instrumentalities of the oil burner system.

A partial solution to the problem of sludge and water buildup involves the use of a filter between the tank and the oil burner. However, the filter becomes saturated after a relatively short period of time so that either sludge and water begins to enter the oil burner, or the free-flow of fuel is impaired. This requires frequent servicing of the filter equipment and/or periodic damage to elements of the burner system. Frequent service calls represents a nuisance and an expense to the consumer as well as the constant source of aggravation to the oil dealer.

Up to the present time, the most effective solution to the problem of sludge and water buildup in a fuel tank is to attempt to remove the sludge and water from the tank. The removal of sludge and water must be done by professionals since special pumping equipment is required. This process is time consuming and expensive and must be performed when the oil supply in the tank is low. Although the solution is effective in reducing the sludge and water level in the tank, a certain amount of sludge remains along the sides of the tank. This sludge eventually comes away from the walls of the tank and contaminates the fuel. These and other difficulties experienced with the prior art devices have been obviated by the present invention.

It is, therefore, a principle object of the invention to provide an adaptor for a fuel tank which prevents sludge and water from being drawn through fuel line for a substantial period of time.

Another object of this invention is the provision of an adaptor for a fuel tank which substantially increases the effective life of the tank in terms of sludge and water problems with a minimal of loss of capacity of the tank.

A further object of the present invention is the provision of an adaptor for a fuel tank which is effective to draw off fuel from a point above the sludge and water level and which is selectively adjustable with respect to the draw off point relative to the bottom of the tank.

It is another object of the present invention to provide a sludge and water prevention adaptor for a fuel tank which is inexpensive, easy to install, and effective for a substantial period of time.

A still further object of the invention is the provision of an adaptor which includes an inlet opening inside the tank which can be selectively and accurately positioned from outside of the tank.

With these and other objects in view, as will be apparent to those skilled in the art, the invention resides in the combination of parts set forth in the specification and covered by the claims appended hereto.

SUMMARY OF THE INVENTION

The invention consists of an adaptor for a fuel tank which comprises a feed tube having an inlet opening at one end and an outlet opening at the opposite end and which is adapted to extend through the outlet opening of the fuel tank so that the inlet opening is positioned substantially above the sludge and water level within the tank. The adaptor also includes tubular coupling means slidably mounted on the feed tube for attachment to the outlet opening of the tank into the fuel line and sealing means for forming a seal between the tubular coupling means and the feed tube.

BRIEF DESCRIPTION OF THE DRAWINGS

The character of the invention, however, may be best understood by reference to one of its structural forms, as illustrated by the accompanying drawings, in which:

FIG. 2 is an enlarged side elevational view of the adaptor with portions in section, FIG. 3 is an end elevational view of the adaptor looking from the outlet end of the adaptor, and FIG. 4 is a view similar to FIG. 3, showing a modification.

DESCRIPTION OF THE PREFERRED EMBODIMENT

Figure 1:
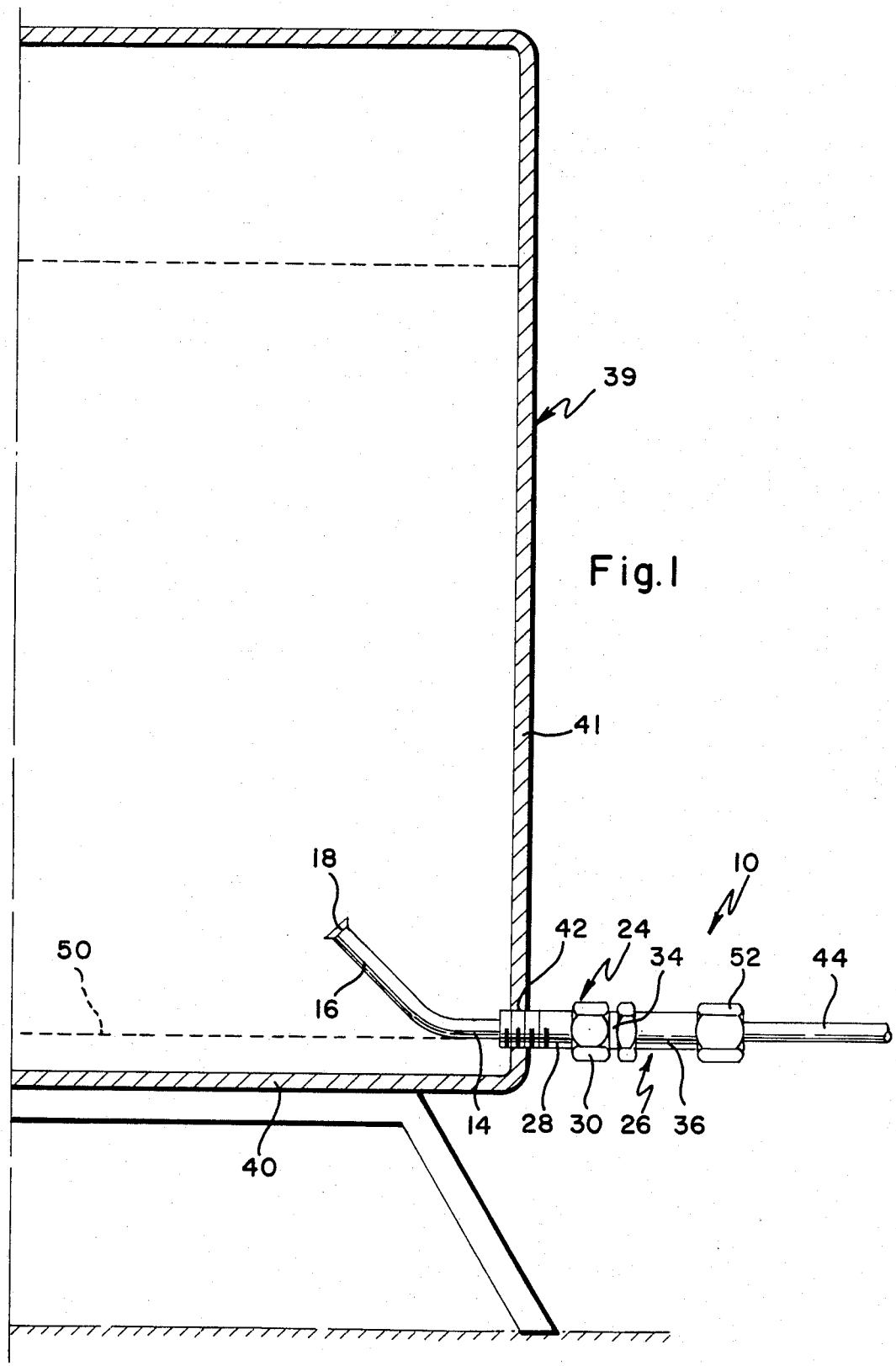
FIG. 1 is a side elevational view of an adaptor embodying the principles of the present invention shown applied to a fuel and a fuel line.

Referring to the drawings and particularly to FIG. 2, the fuel line adaptor of the present invention is generally indicated by the reference numeral 10 and comprises a feed tube which is generally indicated by the reference numeral 12 and a tubular coupling means which is generally indicated by the reference numeral 13. The feed tube 12 has a flanged inlet opening 18 at one end and an outlet opening 20 at the opposite end. The tube 12 comprises and outer portion 14 which extends from the outlet opening 12 and an inner portion 16 which extends from the outer portion 14 to the inlet opening 18 at a substantial angle of the central longitudinal axis of the outer portion 14, as shown in FIG. 2. The outer surface of the outer portion 14 is provided with a V-shaped annular protuberance 22 for a purpose to be described.

The tubular coupling means 13 is adapted to be slidably mounted on the outer portion 14 of the feed tube and comprises a first coupling element, generally indicated by the reference numeral 24 and a second coupling element, generally indicated by the reference numeral 26. The first coupling element 24 consists of a threaded male portion 28 at one end and a threaded female portion 30 at the opposite end. A circular valve seat is located at the interior end of the female portion 30. A second coupling element 26 consists of a first threaded male portion 34 at one end and a second threaded male portion 36 at the opposite end. The first threaded portion 34 is adapted to be threaded into the female portion 30 of the first coupling element 24. A second circular valve seat 38 is located at the end of the first male portion 34 so that when the first male portion 34 is threaded into the female portion 30, the annular protuberance 22 is forced into engagement with the valve seats 32 and 38 to form an effective seal between the coupling means 13 and the feed tube 12.

Referring particularly to FIG. 1, there is shown a typical fuel tank to which the adpator of the present invention is applied. The fuel tank is generally indicated by the reference numeral 39 and comprises a bottom wall 14 and a front wall 41 which includes a threaded outlet opening 42 which is located at a short distance above the bottom wall 40. The dotted line 50 indicates the upper level of sludge and water buildup which has reached the outlet opening 42 of the tank. Prior to application of the adaptor 10 of the present invention to the fuel tank 39, a connecting element, not shown, which connects the outlet opening 42 to a fuel line 44 is removed. Each end of the connecting element is provided with male threads. One end of the connecting element is threaded into the threaded outlet opening 42 and the opposite end of the connecting element is threaded into a standard threaded female fixture 42 which is connected to the fuel line 44. After this connecting element is removed, the adaptor 10 is applied by first extending the inner portion 16 through the outlet opening 42 so that the inlet opening 18 of the tube is positioned within the fuel tank 39. The male end 28 of the first coupling element 24 is then threaded into the outlet opening 42 of the tank to form a seal between the outlet opening and the end 28. At this point, the first and second coupling elements 24 and 26, respectively, are uncoupled. Prior to coupling of these elements, the tube 12 is oriented so that the inner portion 16 of the tube extends at an upward angle relative to the outer portion 14. The end edge of the tube at the outlet opening is provided with a pair of diametrically opposed slots 46 and a loating notch 48 which is located at a point intermediate the slots 46. The notch 48 lies in the same plane as the central longitudinal axis of the inner portion 16 so that when the notch 48 is in its uppermost position, the inlet opening 18 of the tube is also in its uppermost position. This enables the installer to position the inlet opening 18 of the tube at any desired position relative to the bottom of the tank and to hold the tube in the selected position. If the installer wishes to position the inlet opening 18 at its maximum distance from the bottom of the tank by having the axis of the inner portion 16 in a vertical plane, the tube 12 is positioned so that the notch 48 occupies the 12 o'clock position when viewed from the outlet end of the tube, as shown in FIG. 3. If desired, the feed tube 12 can be oriented so that the inlet opening 18 is closer to the bottom of the tank in cases where sludge buildup is not too severe and if the installer wishes to minimize the loss of effective capacity of the tank. However, even when the inlet opening 18 is positioned at its maximum distance from the bottom of the tank, the loss in effective capacity of the tank is very small in comparison to the greatly increased effective life of the tank. For example, if it takes 6 to 8 years for the sludge to reach the outlet opening of the tank, the inlet opening 18 of the tube can be positioned so that it takes another 25 to 30 years for the sludge level to reach the inlet opening of the tube and yet there is less than a 3% loss in effective capacity of a standard 275 gal. round bottomed tank. If desired, the installer can position the inlet opening 18 of the feed tube so that it is closer to the bottom of the tank to minimize the loss in effective capacity of the tank and can then, many years later, reposition the inlet opening 18 at its maximum distance from the bottom of the tank. When the tube 12 is properly oriented, it is maintained in this orientation by inserting the blade of a flat tool, such as a screwdriver, into the slots 46 to prevent the tube from turning about its axis while the first threaded male portion 34 of the second coupling element 26 is threaded into the female portion 30 of the first coupling element 24. The first and second coupling elements 24 and 26, respectively, are each provided with an outer hex surface for the application of a wrench. When the first and second coupling elements 24 and 26 are tightened, a seal is formed between the V-shaped protuberance 22 of the feed tube and the valve seats 32 and 34. The adapter 10 is then attached to the fuel line 44 by screwing a standard female pipe fixture 52 onto the second threaded male portion 36. The fixture 52 is mounted on the fuel line 44 so that it can be rotated relative to the fuel line 44.

MODIFIED ADAPTOR

Referring to FIG. 4, there is shown a modified fuel line adaptor which is generally indicated by the reference numeral 60. The adaptor 60 is identical to the adaptor 10 in every way except for the outlet end of the feed tube 12. The portions of the adaptor 60 are identified with the same reference numerals as comparable portions of the adaptor 10 except that the reference numerals for the modified adaptor 60 include a prime. The outlet end of the modified adaptor 60 is provided with a pair of diametrically opposed flat surfaces 62 instead of slots for the purpose of holding the feed tube in a desired orientation. The flat surfaces 62 are adapted to receive an open end wrench for holding the tube while the coupling elements are coupled together. A notch 48' is located at an intermediate point on the end edge of the outlet end of the tube between the flat surfaces 62, and serves as an indicator to the relative position of the inlet opening of the feed tube.

It is obvious that minor changes may be made in the form and construction of the invention without departing from the material spirit thereof. It is not, however, desired to confirm the invention to the exact form herein shown and described, but it is desired to include all such as properly come within the scope claimed.

The invention having been thus described, what is claimed as new and desired to be secured by Letters Patent is:

1. Fuel line adaptor for a fuel line having a standard pipe fixture and a fuel tank having a bottom wall, a front wall and an outlet opening in the front wall adjacent the bottom wall, said adaptor comprising:
   (a) a first coupling element which is adapted to be sealingly connected with said outlet opening and having a bore which extends horizontally when said first coupling element is connected with said outlet opening,
   (b) a second coupling element which is adapted to be connected with said first coupling element and adapted to be connected to the pipe fixture of said fuel line, said second coupling element having a bore which extends horizontally when said second coupling element is connected with said first coupling element,
   (c) a feed tube which has an outer end, an outlet opening at said outer end, an inner end portion one end of which is connected to the end opposite said outlet opening and an inlet opening at said inner end, said inner end, said outer end being adapted to extend horizontally through the bores of said first and second coupling elements and through the outlet opening of the tank, said outer end having a central axis and being rotatable about said axis relative to said first and second coupling elements prior to complete coupling of said first and second coupling elements and said outer end being prevented from rotating about said axis when said first and second coupling elements are completely coupled, said inner end extending at a substantial angle relative to said outer end so that said inlet opening is located at a substantial distance above the outlet opening of the tank when said outer end extends through the outlet opening of the tank and is rotated about said axis to a position where said inner end extends from said outer end at an upward angle, and (d) means for preventing said rotation about said axis and for forming a seal between said feed tube and said first and second coupling elements when said first and second coupling elements are connected together for complete coupling.

2. Fuel line adaptor as recited in claim 1, wherein said rotation preventing and sealing means comprises:
 (a) a first valve seat in said first coupling element,
 (b) a second valve seat in said second coupling element, and
 (c) an annular protuberance on the outer surface of said feed tube for sealingly engaging said first and second valve seats when said first and second coupling elements are connected.

3. Fuel line adaptor as recited in claim 1, wherein said outer end of the feed tube is provided with a slot at said outlet opening for receiving a blade of a turning tool for rotating the outer end about its central longitudinal axis to position the inner end in a desired orientation relative to the bottom of the tank.

4. Fuel line adaptor as recited in claim 1, wherein said outer end of the feed tube is provided with a pair of opposed flat areas adjacent said outlet opening for receiving a wrench for rotating the outer end about its central longitudinal axis to position the inner end in a desired orientation relative to the bottom of the tank.

5. Fuel line adaptor as recited in claim 1, wherein said outer end of the feed tube is provided with a visual indicator which correlates with the angular direction of the inner end of the feed tube so that an individual can determine the position of the orientation of the inner end relative to the bottom of the tank.

6. Fuel line adaptor for a fuel line having a standard pipe fixture and a fuel tank having a bottom wall, a front wall, an outlet opening in the front wall adjacent the bottom wall, said adaptor comprising:
 (a) a feed tube having an inlet opening at one end and an outlet opening at the opposite end, said feed tube having an outer portion which extends from said outlet end and an inner portion which extends from said outer portion to said inlet opening at a substantial angle to said outer portion, said feed tube being adapted to extend through the outlet opening of the fuel tank so that said outer portion lies horizontally and substantially outside of the tank, and said inner portion lies within the fuel tank, whereby said inlet opening is capable of being positioned substantially above the inlet opening of the fuel tank by orienting the feed tube so that said inner portion extends at an upward angle from said outer portion,
 (b) tubular coupling means slidably mounted on said outer portion and adapted to sealingly engage the outlet opening of the fuel tank and the standard fuel line pipe fixture, said outer portion having a central axis and being rotatable about said axis relative to said coupling means prior to complete coupling of said coupling means, said outer portion being prevented from rotating about said axis upon complete coupling of said coupling means, and
 (c) sealing means for preventing said rotation about said axis and for forming a seal between said tubular coupling means and the outer portion of said tube.

7. Fuel line adaptor as recited in claim 6, wherein said tubular coupling means comprises a first coupling element which is adapted to be connected with the outlet opening of said fuel tank and a second coupling element which is adapted to be connected to the pipe fixture of said fuel line and coupled to said first coupling element, said sealing and rotation preventing means comprising:
 (a) a first valve seat on said first coupling element,
 (b) a second valve seat on said second coupling element, and
 (c) an annular protuberance about the outer portion of said tube for forming a seal with said first and second vave seats which when said first and second coupling elements are coupled.

* * * * *